July 5, 1960 R. A. HENLE ET AL 2,943,791

BINARY ADDER USING TRANSFORMER LOGICAL CIRCUITS

Filed Dec. 28, 1954 2 Sheets-Sheet 1

INVENTORS
ROBERT A. HENLE
MARION L. WOOD
BY
ATTORNEY

BINARY ADDER USING TRANSFORMER LOGICAL CIRCUITS

Filed Dec. 28, 1954 2 Sheets-Sheet 2

*INVENTORS*
ROBERT A. HENLE
MARION L. WOOD

*BY* [signature]
ATTORNEY

United States Patent Office 2,943,791

Patented July 5, 1960

2,943,791

BINARY ADDER USING TRANSFORMER LOGICAL CIRCUITS

Robert A. Henle, Hyde Park, and Marion L. Wood, Highland, N.Y., assignors to International Business Machines Corporation, New York, N.Y., a corporation of New York Filed Dec. 28, 1954, Ser. No. 478,094

9 Claims. (Cl. 235—176)

This invention relates to logical circuits, more particularly to logical circuits utilizing transformers, and to a binary adder comprising such logical circuits.

A logical circuit may be defined as a circuit having a plurality of inputs and a single output, and means interconnecting the inputs with the output so as to produce an output signal only when signals are received at a certain combination or combinations of inputs. Such circuits are extensively used in modern high speed digital computers. The logical circuits used in such computers respond to and produce signals in the form of pulses, typically either peaked or square wave pulses.

A particular type of logical circuit is known as a coincident circuit, or an AND circuit. Such a circuit has two or more inputs, and produces an output signal only when signals are received at all of the inputs simultaneously.

Another common type of logical circuit is known as a mixing circuit or as an OR circuit. Such a circuit has two or more inputs and produces an output signal whenever a signal is received at any one or more of the inputs.

Logical circuits of the type described are required to be used in connection with a wide range of signal sources, some of which may have impedances different substantially from the others. Similarly, the output of such logical circuits may be connected to any of a number of different devices or circuits having substantially different input impedances.

An object of the present invention is to provide logical circuits which are readily adaptable for use with signal sources of different impedances and with loads of different impedances.

Another object is to provide a logical circuit including a transformer at each input and a transformer at the output.

Another object is to provide logical circuits of the type described including simplified circuit elements interconnecting the input and output transformers.

Another object of the invention is to provide a binary adder employing logical circuits of the type described.

Another object is to provide a self-checking binary adder.

The foregoing objects are attained by providing a logical circuit employing a transformer for each input and one for the output. A coincidence circuit is provided by connecting the secondary windings of the input transformers in a series loop with the primary winding of the output transformer. The input transformer secondaries are connected with their potentials aiding. Also connected in series loop are a diode and a battery having a potential opposed to the potentials induced in the input transformer secondary windings and equal to the sum of all but one of those potentials, said diode being poled so that it is reversely biased by the battery potential. Such a circuit produces an output signal only when signals are received at all the inputs simultaneously.

A mixing circuit is provided by connecting the secondaries of the input transformers in parallel with the primary of the output transformer. Such a circuit produces an output signal whenever a signal is received at any of the inputs. Another form of mixing circuit includes an amplifier between the parallel secondary input windings and the primary output winding to make up the losses in the circuit.

A plurality of such coincident and mixing circuits are connected in a network in accordance with a mathematically determined pattern to produce a self-checking binary adder.

Other objects and advantages of the invention will become apparent from a consideration of the following specification and claims, taken together with the accompanying drawings.

FIG. 1

Figure 1:
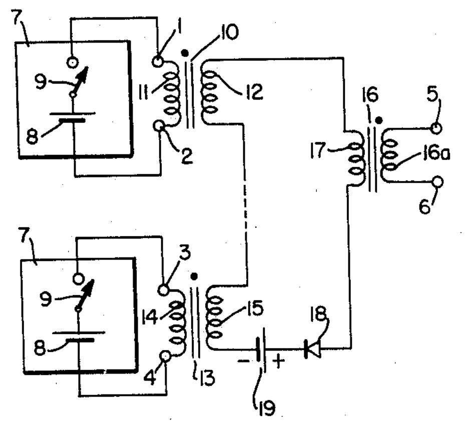
Fig. 1 is a wiring diagram of a coincident circuit embodying the invention.

This figure illustrates a coincident circuit including a first pair of input terminals 1, 2, a second pair of input terminals 3, 4, and a single pair of output terminals 5, 6. Connected to input terminal 1, 2 is a signal generator 7. Any suitable signal generator may be used. In order to provide a simple example, the signal generator 7 is indicated as comprising a battery 8 and a switch 9 by which the potential of battery 8 is selectively connected to or disconnected from the input terminals 1 and 2. Closure of switch 9 sends a current through primary winding 11. Initiation of the current flow in winding 11 produces a signal potential of predetermined polarity in secondary winding 12. This signal pulse is a transient which disappears if switch 9 remains closed. A similar signal generator 7 is connected to the input terminals 3 and 4. A more typical source of signals would be an electronic circuit producing pulse type signals.

An input transformer 10 has a primary winding 11 connected to input terminals 1 and 2 and a secondary winding 12. An input transformer 13 has a primary winding 14 connected to input terminals 3 and 4 and a secondary winding 15. An output transformer 16 has a primary winding 17 and a secondary winding 16*a* connected to output terminals 5 and 6.

The secondary windings 12 and 15 of the input transformers are connected in a series loop with the primary winding 17 of the output transformer, a diode 18 and a battery 19. The diode 18 is poled oppositely to the battery 19. In other words, the battery 19 is poled to send current through the diode 18 in its high impedance direction. Substantially no current will flow in that direction through the diode 18, and consequently no current flows in that direction through the loop circuit.

In order to produce a current flow in the opposite direction through the load circuit, the sum of the potentials induced in the secondary windings 12 and 15 must exceed the potential of battery 19. The potential of battery 19 is selected so that it is equal to the sum of the potentials induced in all but one of the secondary windings in the loop circuit. In the circuit illustrated, there are two input secondary windings 12 and 15, and the potential of battery 19 is chosen equal to the potential induced in one of those secondary windings. Consequently, when potentials are induced simultaneously in both the secondary windings 12 and 15, the potential of battery 19 is overcome and a current flows through primary winding 17, inducing a potential in secondary winding 16a of the output transformer 16, producing an output signal at terminals 5 and 6. A signal in one only of the input secondary windings will be bucked by the battery 19 and will produce no output signal.

Summarizing, signals must be received at both sets of input terminals 1, 2 and 3, 4 simultaneously in order to produce a signal at the output terminals 5 and 6.

Signals are induced in the secondary windings 12 and 15 only when the current flow in the primary winding is changing. Consequently, the signals must be received substantially simultaneously at the input terminals 1, 2 and 3, 4 in order for the potentials induced in the secondaries 12 and 15 to be concurrent. The circuit is therefore well adapted for use in systems where the signals consist of rapidly changing pulses of brief duration, such as are commonly used in high speed digital computers.

The turn ratios of the various input and output transformers may be varied as required to match the impedance of the coincidence circuit with the particular input signal generators and load devices employed.

FIG. 2

This figure illustrates a mixing circuit including input transformers 20 and 21 and an output transformer 22.

Input transformer 20 has a primary winding 23 and a secondary winding 24. Input transformer 21 has a primary winding 25 and a secondary winding 26. Output transformer 22 has a primary winding 27 and a secondary winding 28.

Primary winding 23 is connected to a first set of input terminals 29 and 30. Primary winding 25 is connected to a second set of input terminals 31 and 32. Secondary winding 28 is connected to output terminals 33 and 34.

The two sets of input terminals 29, 30 and 31, 32 receive signals from two signal generators 7.

The secondary windings 24 and 26 of the input transformers are connected in parallel to wires 35 and 36 and thence to the primary winding 27 of output transformer 22.

It may be seen that when a signal is received from either of the generators 7, that signal induces a potential in the secondary winding of one of the input transformers, thereby producing a current flow in the primary winding of the output transformer and an output signal at the terminals 33 and 34. The circuit therefore operates as a typical OR circuit, producing an output signal in response to one or the other or both of its inputs. It will be readily understood that a large number of input transformers may be connected with their secondaries in parallel with the primary winding of a single output transformer.

FIGS. 3 AND 4

Figure 2:
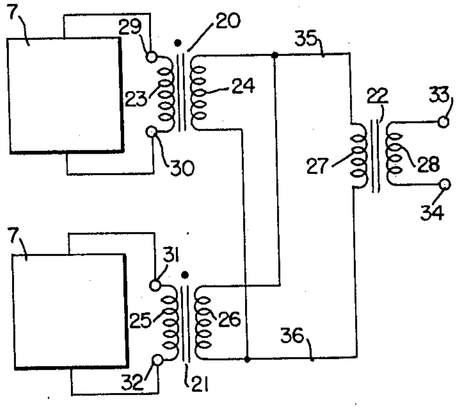
Fig. 2 is a wiring diagram of a mixing circuit embodying the invention.

This circuit illustrates a modification of the mixing circuit of Fig. 2, in which an amplifier is connected between the input transformers and the output transformers. The amplifier makes up the losses in the circuit, and also establishes a standard output pulse, regardless of the number of inputs which are simultaneously active. Those circuit elements in Fig. 3 which are the same as the corresponding elements in Fig. 2 have been given the same reference numerals and will not be further described.

Figure 3:
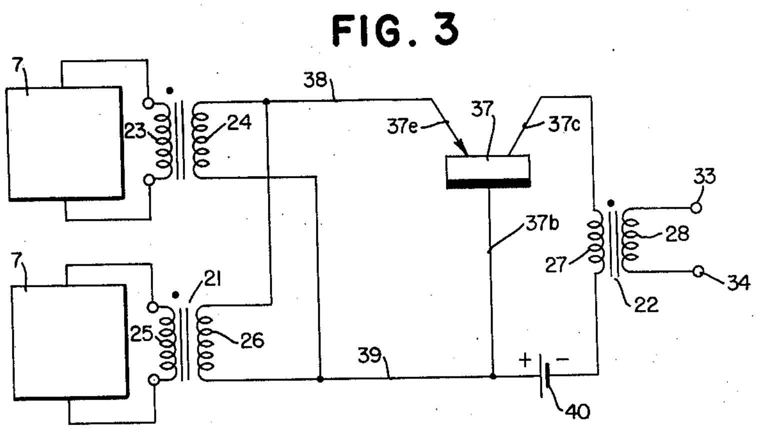
Fig. 3 is a wiring diagram of a modified form of mixing circuit, including a transistor amplifier.

The amplifier in Fig. 3 includes a transistor 37 having an emitter electrode 37e, a collector electrode 37c and a base electrode 37b. Emitter electrode 37e is connected through a wire 38 to the input secondary windings 24 and 26 in parallel. The opposite terminals of the input secondary windings are connected to a wire 39 and thence to the base electrode 37b. Collector electrode 37c is connected in series with the primary winding 27 of output transformer 22 and a load supply battery 40.

Figure 4:
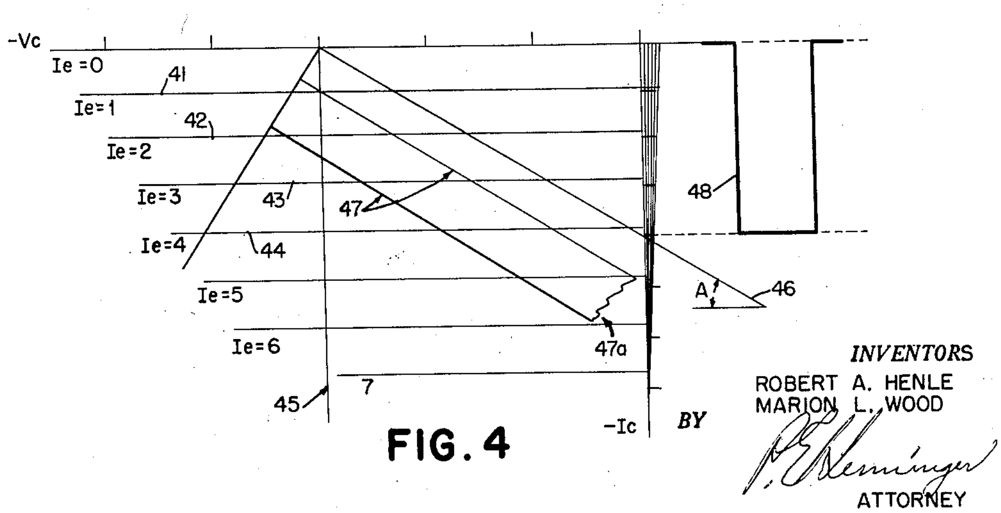
Fig. 4 is a graphical representation of the operation of the transistor amplifier in the circuit of Fig. 3.

Fig. 4 illustrates a family of volt-ampere characteristics of the collector 37c of Fig. 3, taken for various values of emitter current. In Fig. 4, the abscissae represent collector-to-base potential ($V_c$), and the ordinates represent collector current ($I_c$). The values of emitter current $I_e$ are illustrated by legends on the curves 41, 42, 43 and 44.

The line 45 represents the D.C. load line. The slope of this line with respect to the vertical is very small, indicating that the impedance of the secondary winding 27 to direct current is very small. The line 46 represents the A.C. load line. The slope of this line represents the impedance of the secondary winding 27 to alternating current. An input signal appearing at the emitter 37e has a current wave illustrated in Fig. 4 by the square wave 47 having an irregular top 47a. This input signal produces at the collector 37c an output signal illustrated by the square wave 48. As the input signal varies along the line 47, the output signal varies along the line 48. Note that the irregular top of the input signal at 47a is cut off and squared, since the top 47a is in the saturation region of the transistor and does not produce corresponding variations in the collector current.

The A.C. load line 46 makes an angle A with the horizontal, whose tangent is equal to $$\frac{1}{n^2 R_L}$$

where $n$ represents the turn ratio of the output transformer and $R_L$ represents the impedance load on the output terminals 33, 34.

It may be seen that if the signal from a single one of the input transformers 20 and 21 produces a current wave such as that indicated in 47 in Fig. 4, then even though signals are received simultaneously from both input transformers, and the emitter current wave is thereby doubled in amplitude, nevertheless the transistor is effective to cut off the top of the wave so that the output signal 48 has the same amplitude regardless of whether a signal is received from one input alone or from both simultaneously. This is typical mixing circuit or OR circuit operation.

FIG. 5

This figure is a wiring diagram for one numerical order of a self-checking binary adder. Such an adder includes, for each numerical order, single inputs from two binary sources, together with a third input, which serves as the carry input from the next lower order. Such an adder also includes, for each numerical order, two outputs, respectively identified as the sum and carry outputs. The sum output produces a binary signal indicating the binary value of the order. The carry output produces a signal each time the order has two digits or "bits" fed into it.

The present binary adder is self-checking, in that each of the three binary inputs for the order is arranged to produce either a first positive signal indicating the presence of a binary digit or a second positive signal indicating the absence of a binary digit. In order for the adder to add a digit from one input, it is necessary for the positive "digit" signal to be received and also for the positive "no digit" signal to be absent.

Figure 5:
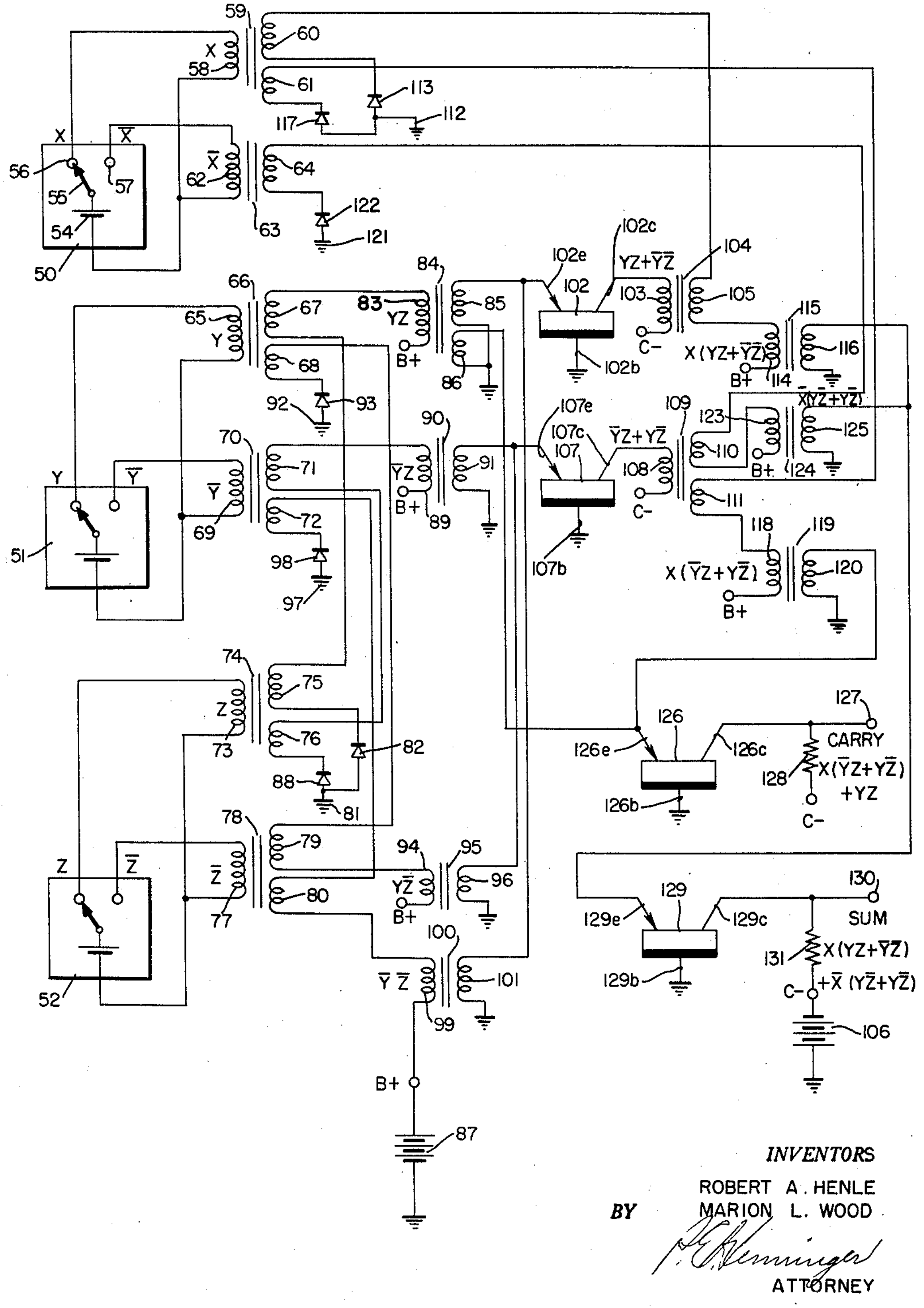
Fig. 5 is a wiring diagram of a binary adder network including coincident circuits of the type shown in Fig. 1 and mixing circuits of the type shown in Fig. 3.

Referring to Fig. 5, there are shown three signal generators 50, 51 and 52, respectively referred to hereinafter as the X, Y and Z signal generators. The X and Y generators may be the binary inputs of one numerical order, while the Z generator may be the carry input from the next lower order. In order to provide a simple example, each of these three signal generators is illustrated as comprising a battery 54, and a double-throw switch 55 shiftable between output terminals 56 and 57. In the case of signal generator 50, the output terminal 56 is sometimes hereinafter identified as the X output terminal and the output terminal 57 is identified as the $\bar{X}$-terminal. When it is desired to produce a positive signal indicating that a digit from the X input is to be added, then the switch 55 engages terminal 56, as shown, and produces a positive binary signal at that terminal. When it is desired that a positive signal be produced indicating that there is no X digit to be added, then the switch 55 engages the terminal 57. In other words, when the condition X is in its binary 1 value, a positive signal is produced at the X output, and when the condition X is in its binary "0" value, a positive signal is produced at the $\bar{X}$-terminal. Similar conditions prevail at the Y and Z signal generators 51 and 52.

The various possible input conditions for a binary adder with three inputs may be summarized in the following table:

| Inputs | | | Outputs | |
|---|---|---|---|---|
| X | Y | Z | Sum | Carry |
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 1 | 0 | 0 | 1 |
| 1 | 0 | 1 | 0 | 1 |
| 1 | 1 | 1 | 1 | 1 |

The sum output should register a binary "1" whenever the condition existing at the three inputs is one of those characterized in the above table by the presence of a binary "1" in the sum column. In a similar manner, a binary "1" signal is to be produced at the carry output whenever the input signal conditions comprise one of the states characterized by the presence of a binary "1" in the carry column.

In the algebra of logic, or Boolean algebra, which deals exclusively with binary quantities (i.e. quantities capable of assuming only two values), a quantity in its binary "0" value is written with an overscore, e.g. $\bar{X}$, and a quantity in its binary "1" value is written without an overscore, e.g. X. The "or" relationship is indicated by a + sign and the "and" relationship is indicated by any of the usual algebraic symbols representing multiplication.

The foregoing table and the statements in the paragraph following the table may be stated in the algebra of logic as follows:

$$\text{Sum} = \bar{X}\bar{Y}Z+\bar{X}Y\bar{Z}+X\bar{Y}\bar{Z}+XYZ$$
$$= \bar{X}(\bar{Y}Z+Y\bar{Z})+X(\bar{Y}\bar{Z}+YZ)$$
$$\text{Carry} = \bar{X}YZ+XY\bar{Z}+X\bar{Y}Z+XYZ$$
$$= YZ+X(Y\bar{Z}+\bar{Y}Z)$$

The circuit of Fig. 5 is connected to produce electrically the operations described algebraically in the foregoing equations.

The X output terminal of generator 50 is connected to the primary winding 58 of an X input transformer 59 having secondary windings 60 and 61. The $\bar{X}$ output terminal of generator 50 is connected to the primary winding 62 of an $\bar{X}$ input transformer 63 having a secondary winding 64. The Y output terminal of signal generator 51 is connected to the primary winding 65 of a Y input transformer 66 having secondary windings 67 and 68. The $\bar{Y}$ output terminal of generator 51 is connected to the primary winding 69 of a $\bar{Y}$ input transformer 70 having secondary windings 71 and 72.

The Z output terminal of signal generator 52 is connected to the primary winding 73 of a Z input transformer 74 having secondary windings 75 and 76. The $\bar{Z}$ output terminal of generator 52 is connected to the primary winding 77 at a $\bar{Z}$ input transformer 78 having secondary windings 79 and 80.

The secondary windings of the Y, $\bar{Y}$, Z and $\bar{Z}$ input transformers are connected in a series of four coincidence circuits, similar to the coincidence circuit of Fig. 1.

One of these four circuits, termed the YZ circuit, may be traced from a ground connection 81 through a diode 82, secondary winding 75, secondary winding 67, primary winding 83 of a YZ coincidence transformer 84, and thence to the positive terminal B+ of a source of electrical energy indicated by way of example as being a battery 87, and through the battery 87 to ground. Coincidence transformer 84 has secondary windings 85 and 86.

In the drawing, several terminals have been marked with the reference character B+ but only one is shown as being connected to the positive terminal of battery 87. It should be understood that all these terminals are electrically connected, but the connecting wires are omitted to simplify the drawing. Alternatively, a separate battery could be provided for each of the terminals B+.

The second of the said four coincidence circuits, hereinafter referred to as the $\bar{Y}Z$ circuit, may be traced from ground connection 81 through a diode 88, secondary windings 76 and 71, primary winding 89 of a $\bar{Y}Z$ coincidence transformer 90, and thence through terminal B+ and battery 87 to ground. Coincidence transformer 90 has a single secondary winding 91.

The third of the four circuits mentioned above, hereinafter referred to as the $Y\bar{Z}$ circuit, may be traced from a ground connection 92 through a diode 93, secondary windings 68 and 79, primary winding 94 of a $Y\bar{Z}$ coincidence transformer 95, and thence through terminal B+ and battery 87 to ground. Transformer 95 has a single secondary winding 96.

The fourth of the four coincidence circuits, hereinafter termed the $\bar{Y}\bar{Z}$ circuit, may be traced from a ground connection 97 through a diode 98, secondary windings 72 and 80, primary winding 99 of a $\bar{Y}\bar{Z}$ coincidence transformer 100 and thence through terminal B+ and battery 87 to ground. Transformer 100 has a single secondary winding 101.

Certain of the secondary windings of the coincidence transformers 84, 90, 95 and 100 are connected in a series of two mixing circuits.

One of these coincidence circuits, hereinafter referred to as the $YZ+\bar{Y}\bar{Z}$ circuit, includes a transistor 102 having an emitter electrode **102*e*, a base electrode 102*b*, and a collector electrode 102*c*. Base electrode 102*b* is grounded. Emitter electrode 102*e* is connected to the secondary windings 85 and 101 in parallel. Collector electrode 102*c* is connected to the primary winding 103 of a mixing transformer 104 having a secondary winding 105. The opposite terminal of winding 103 is connected to the negative terminal C− of a source of electrical energy indicated as a battery 106**, whose positive terminal is grounded.

In the drawing, several terminals have been marked with reference character C−, but only one is shown as connected to the negative terminal of battery 106. It should be understood that all these terminals are electrically connected, but that the connecting wires are omitted to simplify the drawing. Alternatively, a separate battery could be provided for each of the terminals C−.

The second mixing circuit, hereinafter referred to as the $\bar{Y}Z+Y\bar{Z}$ circuit, includes a transistor 107 having an emitter electrode **107*e*, a base electrode 107*b*, and a collector electrode 107*c*. Base electrode 107*b* is grounded, and emitter electrode 107*e* is connected to the secondary windings 91 and 96 in parallel. Collector electrode 107 is connected to a primary winding 108 of a mixing transformer 109, having secondary windings 110 and 111**.

The secondary windings of the mixing transformers 103 and 109 are connected with the secondary windings of the X and $\bar{X}$ input transformers 59 and 63 in a second series of three coincidence circuits.

One of this second series of three coincidence circuits is termed the $X(YZ+\bar{Y}\bar{Z})$ circuit. This circuit may be traced from a ground connection 112 through a diode 113, secondary windings 60 and 105, primary winding 114 of a coincidence transformer 115 and thence through terminal B+ and battery 87 to ground. Transformer 115 has a single secondary winding 116.

The second of the second series of three coincidence circuits, termed the $X(\bar{Y}Z+Y\bar{Z})$ circuit, may be traced from the ground connection 112 through a diode 117, secondary windings 61 and 111, primary winding 118 of a coincidence transformer 119, and thence through terminal B+ and battery 87 to ground. Transformer 119 has a single secondary winding 120.

The third of the second series of three coincidence circuits, termed the $\bar{X}(Y\bar{Z}+\bar{Y}Z)$ circuit, may be traced from a ground connection 121 through a diode 122, secondary windings 64 and 110, primary winding 123 of a coincidence transformer 124, and thence through terminal B+ and battery 87 to ground. Transformer 124 has a single secondary winding 125.

The secondary windings 120 and 86 are connected in a mixing circuit termed the carry output circuit. This circuit includes a transistor 126 having an emitter electrode **126*e*, a base electrode 126*b* and a collector electrode 126*c*. Base electrode 126*b* is grounded. Emitter electrode 126*e* is connected through the secondary windings 120 and 86 in parallel to ground. Collector 126*c* is connected to a carry output terminal 127, and is also connected through a load resistor 128, terminal C— and battery 106** to ground.

Secondary windings 125 and 116 are connected in a mixing circuit termed the sum output circuit. This circuit includes a transistor 129 having an emitter electrode **129*e*, a base electrode 129*b* and a collector electrode 129*c*. Base electrode 129*b* is connected to ground. Emitter electrode 129*e* is connected through the secondary windings 116 and 125 in parallel to ground. Collector electrode 129*c* is connected to a carry output terminal 130, and is also connected through a load resistor 131, terminal C— and load supply battery 106** to ground.

Where the secondary winding of a transformer is connected to the emitter of a transistor, it is preferred to use an 8 to 1 turn ratio on the transformer so that its secondary will have a low impedance to match the low emitter-base impedance of the transistor. Otherwise, transformers with 1 to 1 turn ratios may be employed in the circuits described above.

*Operation of Fig. 5*

In operation, as mentioned above, the network of Fig. 5 follows the mathematical equations set forth above. Each of the coincidence circuits in effect performs an "and" function in the equations, and each of the mixing circuits performs an "or" function. The specific "and" or "or" function performed by each circuit is indicated in each instance by the title of the circuit as set forth above. The title of each circuit appears as a legend applied to the output transformer of the circuit. For example, the legend YZ appears in the drawing next to the primary winding 83 of the coincidence transformer 84. Similarly, the legend $YZ+\bar{Y}\bar{Z}$ appears next to the primary winding 103 of mixing transformer 104. By following the legends in the drawing and the mathematical equations, it may be seen that the sum and carry outputs can produce binary "1" signals only under the input conditions indicated by the table above. The circuit is self-checking, in that each addition is checked, not only through, for example, an X input, but also through an $\bar{X}$ input.

While we have shown and described the preferred embodiments of our invention, other modifications thereof will readily occur to those skilled in the art, and we therefore intend our invention to be limited only by the appended claims.

We claim:

1. A self-checking binary adder comprising three dual signal sources, positive and negative input transformers connected to each signal source, and means at each source to send a positive signal through the associated positive input transformer when the source is in a binary "1" condition and to send a positive signal through the associated negative input transformer when the source is in a binary "0" condition, each of the four input transformers for two of the dual sources having two secondary windings; four coincidence transformers, a first series of four coincidence circuits, each comprising a series circuit including a secondary winding of each of two of said four input transformers, a diode, a source of biasing potential, and a primary winding of one of said coincidence transformers, one of said coincidence transformers having two secondary windings two mixing transformers, a first series of two mixing circuits, each comprising secondary windings of two of said coincidence transformers connected in parallel, an amplifier having an input connected to said coincidence transformer secondary windings in parallel, and an output connected to the primary winding of one of said mixing transformers, one of said mixing transformers having two secondary windings; three additional coincidence transformers, a second series of three coincidence circuits each comprising a series circuit including a secondary winding of an input transformer of the third of the dual sources, a secondary winding of one of the mixing transformers, a diode, a source of biasing potential and the primary winding of one of said additional coincidence transformers, a carry mixing circuit including the secondary winding of one of said additional coincidence transformers connected in parallel with the second secondary winding of said one mixing transformer, an amplifier having an input connected to said parallel secondary windings and a carry output; and a sum mixing circuit including an amplifier having its input connected to the secondary windings of the other two additional coincidence transformers in parallel, and a sum output.

2. A logical "OR" circuit comprising a plurality of signal inputs, each adapted to produce at times a signal of predetermined amplitude, a transistor including an input electrode, a common electrode and an output electrode, and means connecting all said signal inputs in parallel between said input electrode and said common electrode, said transistor having operating characteristics such that it is driven to saturation by a signal of said predetermined amplitude, so that either a single one or a simultaneous plurality of signals of said amplitude at said inputs drives the transistor to saturation and produces an output signal of substantially the same amplitude at said output electrode.

3. A logical "AND" circuit comprising a plurality of signal inputs, each adapted to produce at times an electrical signal of predetermined amplitude and polarity, means connecting said inputs in series with the signal polarities aiding one another, a diode, a source of unidirectional electrical energy having a potential greater than the sum of the signal potentials of all of said inputs but one, means connecting said source and said diode in series with said inputs, with the potential of the source opposed in polarity to the potentials of the inputs and the diode poled to present its high impedance to current from said source, an output connected in a series loop circuit with said inputs, said diode and said source, said output having a substantial current flowing therein when and only when signals are received simultaneously at all the inputs.

4. A binary adder comprising three signal sources, each adapted to produce at all times direct and inverse binary signals, each said source having a direct signal terminal and an inverse signal terminal at which said direct and inverse signals respectively appear, a first array of four coincidence circuits, means transmitting to each of said four coincidence circuits signals from one terminal of each of two of said sources, each said coincidence circuit having an output terminal at which a signal appears only when signals are received simultaneously from said last-mentioned terminals, a first array of two mixing circuits, means transmitting to each of said two mixing circuits signals from the output terminals of two of said coincidence circuits, each said mixing circuit having a mixing output terminal at which a signal appears whenever a signal is received from either of said last-mentioned output terminals, a second array of three coincidence circuits, means transmitting to each coincidence circuit of said second array signals from one terminal of the third of said three sources and from one of said mixing output terminals, each said coincidence circuit of second array having an output terminal, a carry mixing circuit, means transmitting to said carry mixing circuit signals from an output terminal of one of the second array coincidence circuits, and from an output terminal of one of the first array coincidence circuits, said carry mixing circuit having a carry output terminal, and a sum mixing circuit, means transmitting to said sum mixing circuit signals from the output terminals of the other two of said second array coincidence circuits, said sum mixing circuit having a sum output terminal.

5. A circuit for comparing simultaneous electrical signal pulses from three sources and for producing an output signal upon the occurrence of signals simultaneously at any of certain selected combinations of said sources, comprising means at each source for producing direct and inverse binary electrical signals, each said source having a direct signal terminal and an inverse signal terminal at which said direct and inverse signals respectively appear, said terminals being divided into a first group consisting of the terminals of two of the sources and a second group consisting of the terminals of the third source; a first array of four coincidence circuits, one for each of the possible subcombinations of one terminal from each of the first group of said sources, each said coincidence circuit having two inputs, said inputs being respectively connected to signal terminals of the respective sources corresponding to a particular one of said possible subcombinations, each said coincidence circuit having an output; a first array of mixing circuits, each having a plurality of inputs connected to the outputs of those particular coincidence circuits which correspond to the subcombinations of the first group which appear in said selected combinations with a particular direct or inverse signal terminal of the second group, each said mixing circuit having an output; and a second array of coincidence circuits, at least equal in number to said first array of mixing circuits, each coincidence circuit of said second array having a first input connected to one of the second group, a second input connected to the corresponding one of said mixing circuit outputs, and an output, and a final mixing circuit having a plurality of inputs connected to all of those outputs in said arrays of coincidence circuits, which, taken together, define all of said selected combinations of said sources, said final mixing circuit having an output at which a signal is produced upon the occurrence of any of said selected combinations.

6. A logical circuit comprising a plurality of input transformers, each having primary and secondary windings, an output transformer having a primary winding and a secondary winding; a loop circuit connecting in series all the secondary windings of the input transformers with their potentials aiding, the primary winding of the output transformer, and means effective at all times when currents flow in the primary windings of less than all of said input transformers to block substantially the flow of current through the primary winding of the output transformer.

7. A logical circuit comprising a plurality of input transformers, each having primary and secondary windings, an output transformer having a primary winding and a secondary winding; an input circuit branch including a diode, a source of unidirectional electrical potential, and means connecting the diode, the source and the secondary windings of the input transformers in series with the potentials of the secondary windings aiding each other and opposed to the potential of the source, said diode being poled to oppose its high impedance to current from the source, and means connecting only the terminals of the input circuit branch respectively to the terminals of the output transformer primary winding.

8. A circuit for comparing simultaneous electrical signal pulses from three signal sources and producing an output signal upon the occurrence of signals simultaneously at any of certain selected combinations of said sources, comprising positive and negative input transformers connected to each signal source, means at each source to send a positive signal through the associated positive input transformer when the source is in a binary "1" condition and to send a positive signal through the associated negative transformer when the source is in a binary "0" condition, each of the four input transformers for two of the sources having two secondary windings; four coincidence transformers, a first series of four coincidence circuits, one for each of the possible combinations of one secondary winding from each of said four input transformers, each said coincidence circuit comprising a series circuit comprising a secondary winding of each of two of said four input transformers, a diode, a source of biasing potential, and a primary winding of one of said coincidence transformers; a first array of mixing circuits, each comprising an input connected to at least one secondary winding of said coincidence transformers, and an output; two mixing transformers, each having a primary winding connected to one of said mixing circuit outputs; and a second array of coincidence circuits at least equal in number to said first array of mixing circuits, each coincidence circuit of the second array having a first input connected to a secondary winding of an input transformer of the third source and a second input connected to a secondary winding of one of said mixing transformers, each coincidence circuit of the second array also having an output, and a final mixing circuit having a plurality of inputs connected to all of those outputs in said arrays of coincidence circuits, which, taken together, define all of said selected combinations of said source, said final mixing circuit having an output at which a signal is produced upon the occurrence of any selected combinations.

9. A logical AND circuit comprising a plurality of signal inputs, each adapted to produce at times a unidirectional electrical signal of predetermined amplitude and polarity, means connecting said inputs in series with the signal polarities aiding one another, an asymmetrically conductive element, a source of unidirectional electrical energy having a potential greater than the sum of the signal potentials of all said inputs but one, means connecting said source and said asymmetrically conductive element in series with said inputs, with the potential of the source opposed in polarity to the potentials of the inputs and the asymmetrically conductive element poled to present its high impedance to current from said source, and means responsive to current flow through said asymmetrically conductive element in the forward direction for producing an output signal, whereby an output signal is produced when and only when signals are received simultaneously at all the inputs.

References Cited in the file of this patent

UNITED STATES PATENTS

| | | |
|---|---|---|
| 2,609,143 | Stibitz | Sept. 2, 1952 |
| 2,644,892 | Gehman | July 7, 1953 |
| 2,644,893 | Gehman | July 7, 1953 |
| 2,674,727 | Spielberg | Apr. 6, 1954 |
| 2,693,907 | Tootill | Nov. 9, 1954 |
| 2,695,993 | Haynes | Nov. 30, 1954 |
| 2,749,034 | Williams et al. | June 5, 1956 |

(Other references on following page)

UNITED STATES PATENTS

| | | |
|---|---|---|
| 2,803,401 | Nelson | Aug. 20, 1957 |
| 2,851,219 | Hussey | Sept. 9, 1958 |

OTHER REFERENCES

Haynes: Magnetic Cores as Elements of Digital Computing Systems, Thesis. Univ. of Illinois, Urbana, Ill., 1950, pages 36 to 44.

Auerbach et al.: The Binac, Proc. of the I.R.E., January 1952, pages 19, 20.

Olsen: A Magnetic Matrix Switch and its Incorporation into a Coincident Current Memory, M.I.T. Report R-211, June 6, 1952, pages 81 to 88.